United States Patent [19]

Kornrumpf et al.

[11] 4,447,764
[45] May 8, 1984

[54] POWER SUPPLY FOR LOW-VOLTAGE INCANDESCENT LAMP AND LIKE LOAD

[75] Inventors: William P. Kornrumpf, Albany, N.Y.; Paul T. Cote, Cleveland Heights, Ohio

[73] Assignee: General Electric Company, Schenectady, N.Y.

[21] Appl. No.: 379,393

[22] Filed: May 18, 1982

[51] Int. Cl.³ ............................................. H05B 39/04
[52] U.S. Cl. ............................... 315/240; 315/227 R; 315/291; 315/311; 315/DIG. 4; 323/209; 363/62
[58] Field of Search ................... 315/227 R, 240, 291, 315/307, 311, DIG. 4; 307/109; 363/62, 142; 323/209–211, 293, 352, 364, 370, 905

[56] References Cited

U.S. PATENT DOCUMENTS

| | | | |
|---|---|---|---|
| 3,274,484 | 9/1966 | Gebhardt et al. | 315/240 X |
| 3,530,370 | 9/1970 | Yamachi et al. | 323/210 |
| 4,234,843 | 11/1980 | Gyugyi et al. | 323/210 |

FOREIGN PATENT DOCUMENTS

| | | | |
|---|---|---|---|
| 208114 | 12/1955 | Australia | 315/291 |
| 53-2970 | 1/1978 | Japan | 315/291 |
| 280022 | 11/1927 | United Kingdom . | |
| 335618 | 9/1930 | United Kingdom . | |
| 397000 | 8/1933 | United Kingdom . | |
| 1254297 | 11/1971 | United Kingdom . | |
| 1329492 | 9/1973 | United Kingdom . | |
| 1350176 | 4/1974 | United Kingdom . | |
| 1358666 | 7/1974 | United Kingdom . | |
| 1415634 | 11/1975 | United Kingdom . | |
| 1555366 | 11/1979 | United Kingdom . | |
| 1567749 | 5/1980 | United Kingdom . | |
| 2077528 | 12/1981 | United Kingdom . | |

*Primary Examiner*—Eugene R. LaRoche
*Attorney, Agent, or Firm*—John P. McMahon; Philip L. Schlamp; Fred Jacob

[57] ABSTRACT

A power supply, operating at line frequencies, for energizing a low-voltage lamp and like loads, utilizes a main capacitor in series with the load across the A.C. line source, and an auxiliary capacitor connected across the main capacitor by a switching device during a selected portion of the source waveform cycle. The minimum load current is established by the main capacitor, with additional load current flowing through the auxiliary capacitor during those portions of the source waveform cycle when connected, whereby the load current may be adjusted over a range established by the magnitude of the main and auxiliary capacitors. An open-loop circuit is disclosed for controlling the portion of the cycle during which the auxiliary capacitor is connected.

34 Claims, 9 Drawing Figures

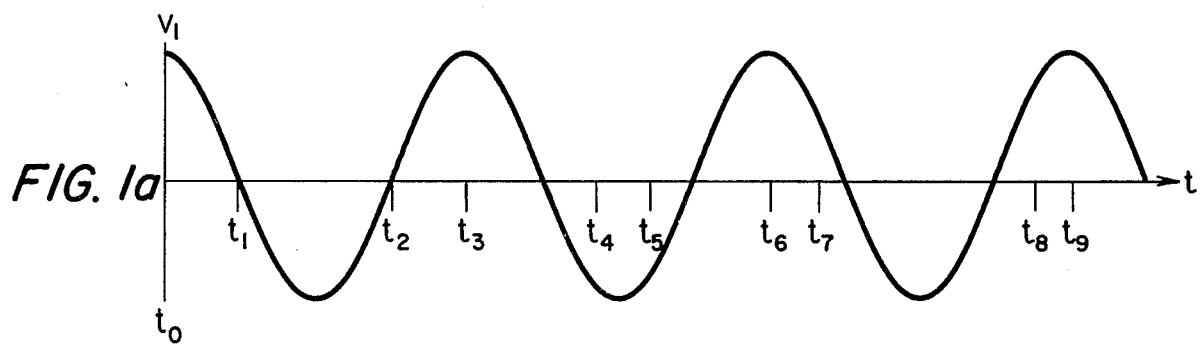
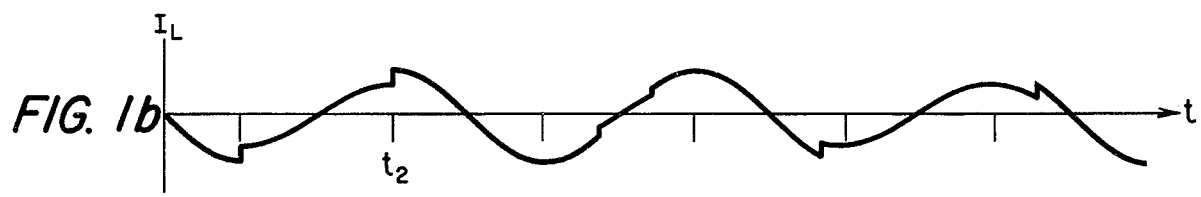
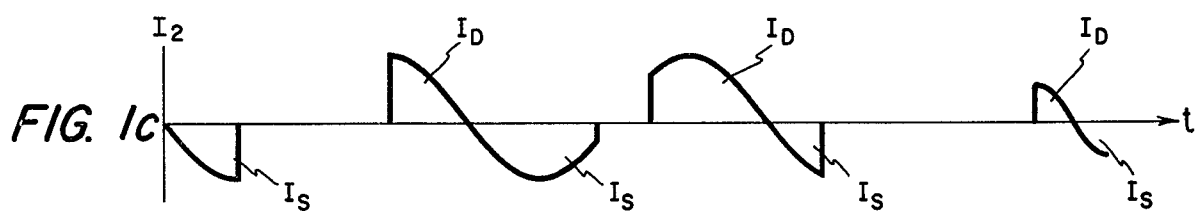
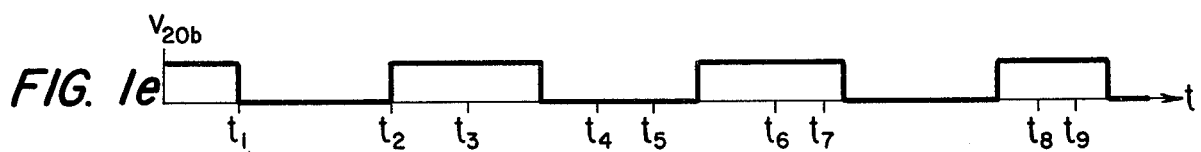
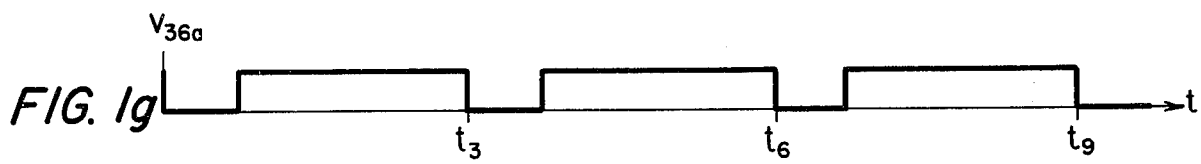

POWER SUPPLY FOR LOW-VOLTAGE INCANDESCENT LAMP AND LIKE LOAD

CROSS REFERENCE TO RELATED APPLICATION

U.S. patent application Ser. No. 379,410, Paul T. Cote', filed concurrently herewith, for "Power Supply For Low Voltage Incandescent Lamp" and assigned the same as this invention.

BACKGROUND OF THE INVENTION

The present application relates to low-voltage power supplies and, more particularly, to a novel line-frequency power supply for energizing a low-voltage load.

It is often desirable to operate a low-voltage load from a relatively higher voltage A.C. source. In particular, there exists a class of low-voltage lamps having an improved efficacy due to operation of the lamp filament at a lower voltage than has been traditionally used for lamp operation. Many circuits for providing such operation either exhibit undesirably high levels of electromagnetic interference or require components having relatively high current and/or voltage ratings. In particular, previous attempts at providing low voltage power sources for incandescent lamps have utilized magnetic components for voltage transformation purposes. The cost of such magnetic components has prevented the resulting power supplies from being economical. Other power supplies have utilized phase-control waveforms, in which very narrow pulses are required, with high surge currents being provided across the load; reliability is frequently reduced in this manner. It is therefore highly desirable to provide a power supply for a low-voltage incandescent lamp and the like load, having relatively low cost, high reliability and in which components of relatively small current rating can be utilized.

BRIEF SUMMARY OF THE INVENTION

In accordance with the invention, apparatus for supplying line-frequency current to a low-voltage load from a higher voltage A.C. source, includes a main capacitor in series with the load across the source, and an auxiliary capacitor connected across the main capacitor by a switching device for a selected portion of each source waveform cycle, responsive to a control signal provided by control logic means. A diode is connected to conduct in shunt with, and for opposite conduction polarity to, the control conduction path of the switching device. The total variation of load current is controlled by the ratio of the main capacitor value to the total capacitance (the sum of the auxiliary and main capacitor values) in the circuit. The switching device is preferably switched to its conductive condition either when the shunting diode is conductive, or at a positive peak voltage across the main capacitor, if the shunting diode is nonconductive.

In a presently preferred embodiment of our invention, the control logic means monitors the voltage across the main capacitor and across the load, to determine the time instant for triggering a monostable multivibrator which turns on the device for a time interval set by the multivibrator output-pulse control.

Accordingly, it is an object of the present invention to provide a novel power supply, operating at line frequency, for controlling the power to a low-voltage incandescent lamp and a like load.

This and other objects of the present invention will become apparent upon consideration of the following detailed description, when read in conjunction with the drawings.

BRIEF SUMMARY OF THE DRAWINGS

FIGS. 1a, 1b, 1c, 1d, 1e, 1f and 1g are time-coordinated graphical representations of the main capacitor voltage, load current, auxiliary capacitor current, switching device drive signal and intermediate control logic means voltages for illustrative load currents over the total adjustment range of the supply, and useful in understanding the principles of the present invention.

DETAILED DESCRIPTION OF THE PREFERRED EMBODIMENT

Figure 1:
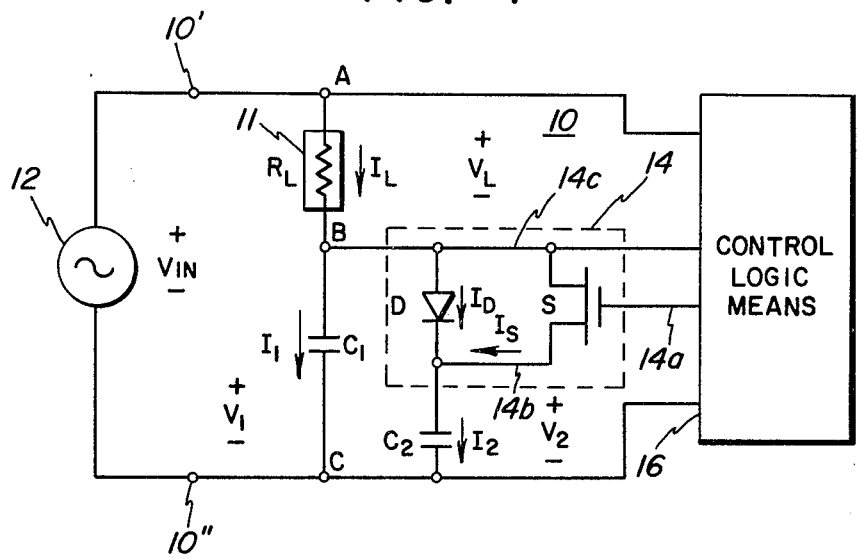
FIG. 1 is a schematic block diagram of the novel low-voltage load power supply of the present invention.

Referring now to FIGS. 1, 1a, 1b, 1c and 1d the novel power supply 10 is utilized for controlling the magnitude of power applied to a load 11 from an A.C. source 12. Load 11 can be a low-voltage incandescent lamp, for example, operating at a voltage $V_L$ of between about 24 volts and about 36 volts. The power supply 10 enables the lamp to operate at a selectable fixed output power in a relatively small range of brightness; in such application, a relatively small range of lamp voltage $V_L$ is required, while the lamp current $I_L$ is variable over a predetermined, e.g. about 20%, range.

Source 12 is connected to a pair of power supply terminals 10' and 10'', respectively connected to circuit nodes A and C. The load (lamp) 11 is connected between node A and a circuit common node B. A first capacitive element, hereinafter the main capacitor, $C_1$ is connected between nodes B and C. Switching means 14 is connected between node B and one terminal of a second capacitive element, hereinafter the auxiliary capacitor, $C_2$. The remaining terminal of auxiliary capacitor $C_2$ is connected to node C. Terminals A, B and C, as well as the switching means control input 14a, are connected to a logic control means 16. Switching means 14 may be any device capable of controllably providing a low resistance path, between node B and that terminal of auxiliary capacitor $C_2$ furthest from node C, responsive to a signal at its control input 14a, such that a current can flow toward or away from the auxiliary capacitor with respect to common node B. In a preferred embodiment, switching means 14 comprises a unipolar switching device, in parallel with a diode D, having the anode thereof connected to node B and the cathode thereof connected to the auxiliary capacitor $C_2$. Advantageously, the switching means 14 is a power MOS field-effect transistor (MOSFET) S in which diode D is formed as a parasitic device between the drain electrode 14b and the source electrode 14c thereof.

Power supply 10 forms a dynamic parallel-switched capacitive voltage converter in which the minimum current $I_L$ flowing through the load resistance $R_L$ is the main capacitor current $I_1$. An additional component of load current $I_L$ is due to the current $I_2$ flowing through auxiliary capacitor $C_2$. Thus, minimum load current and power occurs if current does not flow through auxiliary capacitor $C_2$ at any point during a cycle of the source 12 waveform. Conversely, maximum load current and power occurs if the auxiliary capacitor current $I_2$ flows for an entire source waveform cycle. A median magnitude of load current and power (and load lamp brightness) is obtained if the auxiliary capacitor current $I_2$ flows for approximately one-half the source waveform cycle. Thus, by changing the percentage of a source waveform cycle during which auxiliary capacitor current $I_2$ flows, the load current and power are adjusted. Switching device S is an active turn-off device, allowing conduction of current therethrough to be actively terminated some time after the device has been turned on. The interval between power switching device S turn-on and turn-off establishes the load current and power magnitude within the adjustment ranges thereof. To prevent undue stress on switching device S, it is desirable to control the switching of auxiliary capacitor $C_2$ such that circulating current is not allowed to flow between auxiliary capacitor $C_2$ and main capacitor $C_1$. Therefore, control logic means 16 is utilized to turn "on" power switching device S for conduction when the voltages $V_1$ and $V_2$ across the pair of capacitors are substantially equal, i.e. during conduction of diode D, or at a positive peak of the main capacitor voltage $V_1$, if diode D is non-conductive.

The operation of circuit 10 may be best understood by consideration of the main capacitor voltage $V_1$ and auxiliary capacitor current $I_2$ waveforms, in the median, substantially-maximum and substantially-minimum load current conditions. At some time $t_0$, the main capacitor voltage $V_1$ (FIG. 1a) is at a positive peak and the main capacitor current $I_1$, because of the low power factor, is substantially 90° out-of-phase with voltage $V_1$, or substantially at zero magnitude. Switching device S is turned on, at time $t_o$, by application of an appropriate voltage $V_{14a}$ to gate electrode 14a, with regard to common node B, by control logic means 16 (FIG. 1c). The switching device S remains conductive until time $t_1$. In this time interval, from time $t_0$ to time $t_1$, the current through auxiliary capacitor $C_2$ begins to decrease toward a negative-polarity peak, which is reached at time $t_1$ (FIG. 1b). The auxiliary capacitor current $I_s$ flows from capacitor $C_2$, through the "on" channel of device S (from drain electrode 14b to source electrode 14c,) and adds to the instantaneous main capacitor current $I_1$ then flowing (toward load 11). Thus, the load current $I_L = I_1 + I_2$.

At time $t_1$, the gate electrode drive terminates, device S is turned off and current $I_2$ ceases to flow. The auxiliary capacitor $C_2$ voltage $V_2$ has discharged substantially to zero volts, although the main capacitor $C_1$ voltage $V_2$ continues to decrease toward a negative peak, as the line voltage $V_{IN}$ approaches a negative peak value. Thereafter, voltage $V_1$ begins to increase until a zero crossing is reached at time $t_2$. During the time interval from time $t_1$ to time $t_2$, diode D is reverse-biased and device S is turned off, whereby only the main capacitor current $I_1$ flows through the load 11. Thus, $I_L = I_1$ in this interval.

At time $t_2$, the main capacitor voltage $V_1$ becomes positive and greater than the substantially zero voltage remaining on auxiliary capacitor $C_2$; diode D becomes forward-biased and diode current $I_D$ flows through auxiliary capacitor $C_2$, the diode and load 11. Thus, during the time interval between time $t_2$, when voltage $V_1$ crosses the zero axis, and time $t_3$, when voltage $V_1$ attains a peak positive value, the diode conducts and the additional current $I_D$ flows as auxiliary capacitor current $I_2$, whereby the load current $I_L = I_1 + I_2$. At time $t_3$, the diode current is essentially zero, and diode conduction ceases. It will thus be seen that in the single-cycle time interval between time $t_0$ and time $t_3$, auxiliary capacitor current $I_2$ flows, in phase with main capacitor current $I_1$, for one-half of the cycle, establishing a median load current value.

In the substantially-maximum load current condition, illustrated for the single-cycle time interval between time $t_3$ and time $t_6$, the auxiliary capacitor current $I_2$ flows for the majority of the cycle (and flows for the entire cycle at the maximum load current condition). Thus, auxiliary capacitor current $I_2$ is caused to flow, starting at time $t_3$, by applying the switching device S driving waveform (FIG. 1c), until turn-off time $t_4$. Therefore, at time $t_3$, device S is rendered conductive at the main capacitor voltage $V_1$ peak (substantially corresponding to the main capacitor current $I_1$ being of zero magnitude). As the main capacitor voltage $V_1$ decreases toward a negative peak, the main capacitor current $I_1$ also decreases toward a negative peak value, attained at the zero crossing of voltage $V_1$ in the $t_3-t_4$ interval, and then increases. The auxiliary capacitor current $I_2$ also decreases toward a negative peak and thereafter increases until time $t_4$, at which time the switching device is turned off and the switching device current $I_S$ (essentially equal to the auxiliary capacitor current $I_2$) ceases. There is no current surge through switching device S at turn-on or turn-off, as the voltages across the capacitors are equal. At time $t_4$, the voltage across auxiliary capacitance $C_2$ is at a relatively high negative value, which is more positive than the main capacitor voltage $V_1$ in the time interval $t_4-t_5$; diode D is reverse-biased. At time $t_5$, the main capacitor voltage $V_1$ again becomes more positive than the auxiliary capacitor voltage $V_2$ and diode D conducts. Diode current $I_D$ increases, until the main capacitor voltage $V_1$ passes through the positive-going zero crossing in time interval $t_5-t_6$, and thereafter decreases. The diode current $I_D$ reaches essentially zero magnitude at $t_6$, when the capacitor voltage reaches a positive peak value, and diode D ceases to conduct. Therefore, the load current $I_L$ is the sum of the in-phase main and auxiliary capacitor currents $I_1$ and $I_2$, in the time intervals $t_3-t_4$ and $t_5-t_6$; the load current is equal to the main capacitor current $I_1$ only in the relatively small time interval $t_4-t_5$. As the auxiliary capacitor current $I_2$ flows for a longer portion of the cycle in time interval $t_3-t_6$ than in time interval $t_0-t_3$, it will be seen that greater load current (and therefore greater load power and load lamp brightness) occurs during the latter time interval.

In the substantially-minimum load current case, illustrated in the time interval $t_6-t_9$, the switching device S is again turned on while the main capacitor voltage is at a peak, at time $t_6$, and is only kept on for a relatively short time, being turned off at time $t_7$. Therefore, the auxiliary capacitor current $I_2$ flows through switching device S (as device current $I_S$) only in the relatively short time interval $t_6-t_7$. At time $t_7$, when device S is turned off, a relatively high positive voltage $V_2$ remains across auxiliary capacitor $C_2$. As main capacitor voltage $V_1$ decreases thereafter, diode D is reverse-biased and neither the diode nor the switching device conduct, until time $t_8$. At time $t_8$, the main capacitor voltage $V_1$ again reaches a positive voltage equal to the positive voltage left across the auxiliary capacitor, and diode D conducts until the end of the cycle, at time $t_9$, when the diode current falls to zero and diode D is about to become reverse biased. It will be seen that the load current $I_L$, in the time interval $t_6-t_9$, is equal to the sum of the in-phase main and auxiliary capacitor currents $I_1$ and $I_2$ in the time intervals $t_6-t_7$ and $t_8-t_9$, and is equal only to the main capacitor current $I_1$ in the time interval $t_7-t_8$, which forms the major portion of time interval $t_6-t_9$. As the time intervals $t_6-t_7$ and $t_8-t_9$ become progressively smaller, the load current also becomes progressively smaller, reaching the minimum load current, established by the main capacitor current $I_1$, when these time intervals become essentially zero.

It will now be seen that the total adjustment range of the load current $I_L$ is established by the relative contribution of auxiliary capacitor current $I_2$ and the portion of each cycle during which that current $I_2$ flows, with respect to the main capacitor current $I_1$. By suitable choice of the capacitance of capacitor $C_2$, with respect to the capacitance of main capacitor $C_1$, the total range of load current variation is established.

Figure 1H:
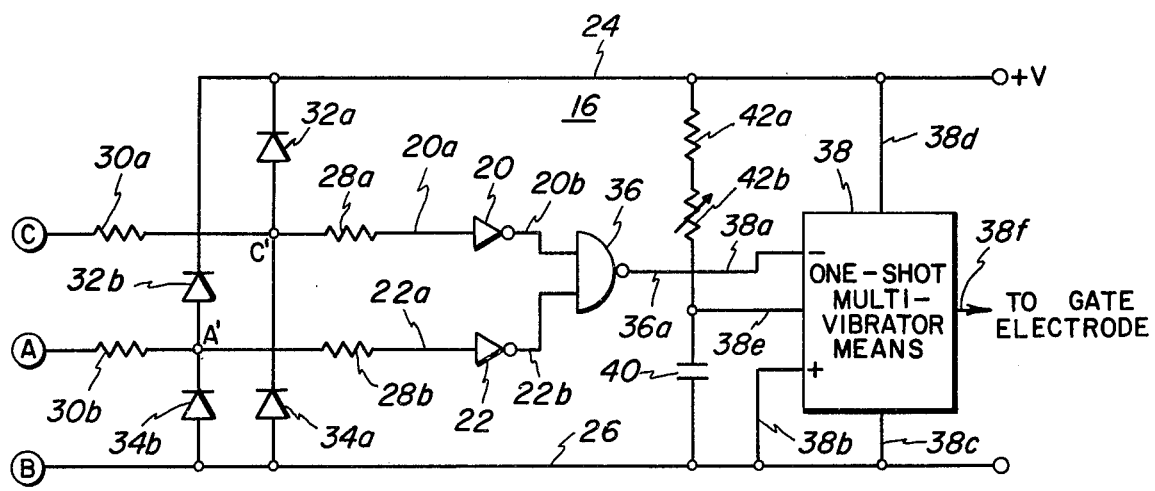
FIG. 1h is a schematic diagram of a control logic means utilizable in the circuit of FIG. 1.

Referring now to all of the Figures, and particularly FIG. 1h, control logic means 16 provides the switching device S gate electrode 14a drive signal to turn on the switching device during the conduction interval of diode D or at the positive peak voltage on main capacitor $C_1$ if diode D is not immediately-previously conducting current. Control logic means 16 also turns off switching device S with the proper timing to establish the total load current magnitude. Circuit 16 includes first and second inverters 20 and 22, each having an input 20a or 22a respectively coupled through first and second resistance elements 28a and 30a, or 28b and 30b, to the associated one of the respective C and A nodes of the power supply. Limiting diodes 32a and 34a are connected to the junction C' between resistances 28a and 30a, and limiting diodes 32b and 34b are connected to the junction A' between resistances 28b and 30b, to limit, commonly referred to in the art as hard limit, the junctions C' and A' voltages, respectively, to be never less than one diode drop below the common node B potential and never greater than one diode drop above a positive voltage logic supply rail 24 (which voltage can be provided by known techniques). The inverter outputs 20b and 22b are each connected to a different one of the pair of inputs of a NAND gate 36. The output 36a of gate 36 is connected to the negative-going trigger input 38a of a one-shot multivibrator means 38, which may be provided as an integrated circuit monostable multivibrator. The positive-going trigger input 38b and the common supply input 38c of means 38 are connected to common node B, while the positive supply input 38d is connected to positive voltage rail 24. An output-pulse time-duration-establishing input 38e is connected to a timing capacitor 40, having the remaining terminal thereof connected to common node B, and also to positive supply rail 24 through the series-connected combination of a first, fixed timing resistance 42a and a variable timing resistance 42b. The multivibrator means output 38f is connected to the switching device input 14a, e.g. to the gate electrode of the power MOSFET device S. The value of fixed resistance 42a is selected to provide a minimum "on" time for the switching device S, and to limit the maximum current drawn by multivibrator means input 38e. The resistance magnitude of variable resistor 42b is selected to achieve a maximum "on" time for the switching device, dependent upon the ratio of maximum to minimum load current/power/brightness required.

In operation, control logic means 16 provides an open-loop control means, in which the voltage across main capacitor $C_1$ is sensed by the hard-limiting inverting means formed by inverter 20, resistances 28a and 30a, and limiting diodes 32a and 34a. As the main capacitor voltage $V_1$ becomes positive, the inverter output 20b falls from a high to a low voltage. Conversely, as $V_1$ becomes negative, the inverter output 20b rises from a low to a high voltage. Thus, output 20b has a low output level for positive voltages across the main capacitor and a high output level for main capacitor negative voltages. Second inverter 22, in association with resistances 28b and 30b and diodes 32b and 34b, also forms a hard-limiting inverting means sensing the voltage $V_L$ across load 11. Therefore, the state of second inverter output 22b is an inverse measure of the load current $I_L$. The voltage output of 20b and 22b are shown in FIGS. 1d and 1e respectively. As shown in FIG. 1f, the output 36a of the NAND gate will have a negative-going transition at the peak of the main capacitor voltage. This negative-going transition triggers one-shot multivibrator means 38, to produce the positive-going gate electrode signal $V_{14a}$, with respect to common node B, having a time duration determined by the magnitude of capacitance 40 and the total resistance of the series-connected resistors 42a and 42b.

While control logic means 16 is shown as an open-loop means, wherein the load current/power/brightness is established by manual adjustment of a variable resistance 42b, it should be understood that a closed-loop control logic means may be equally as well utilized, with a feedback signal being applied, as a current into capacitor 40 or a voltage into charging resistors 42a and 42b, to the monostable multivibrator to vary the conduction time interval of switching device S.

While the present invention has been described with respect to one presently preferred embodiment thereof, many variations or modifications will now become apparent to those skilled in the art. It is out intent, therefore, to be limited only by the scope of the appending claims and not by the specific details and instrumentalities described by way of example herein.

What is claimed is:

1. A power supply for energizing a load at a voltage magnitude less than the voltage magnitude provided by an A.C. source, comprising;

a first capacitive element in series connection with said load across said source, said first capacitive element having a reactance selected to cause the lowest magnitude of desired current flow through said load;

a second capacitive element;

a single active switching device having a path controlled, responsive to a control signal to connect said second capacitive element in parallel connection across said first capacitive element to allow current flow in a first of two directions with respect to said second capacitive element; and a unidirectionally-conducting element in parallel with the controlled path of said switching device and poled to conduct current in the remaining one of two directions with respect to said second capacitive element; wherein conduction of said switching device and said unidirectionally-conductive element establishes a total load current by variation of a portion of the source waveform cycle during which an additional current flows through said second capacitive element and said load.

2. The power supply of claim 1, wherein said power supply further comprises a control circuit including OR circuit means for causing said switching device to begin current conduction in response to a first condition occurring when the unidirectionally-conducting element is conductive and in response to a second condition occurring when the voltage across said first capacitive element is substantially at a polarity peak.

3. The power supply of claim 2, wherein the control circuit triggers said switching to begin current conduction when the voltage across said first reactive element is substantially at a positive polarity peak.

4. The power supply of claim 1, wherein the capacitance of said second capacitive element is less than the capacitance of said first capacitive element.

5. The power supply of claim 4, wherein the ratio of the first and second capacitive elements is selected to provide a desired range of load current variation.

6. The power supply of claim 5, wherein the load current variation range is about 20%.

7. The power supply of claim 1, wherein said control circuit provides said control signal to cause said switching device to conduct current for a controlled time interval occurring once each source waveform cycle.

8. The power supply of claim 7, wherein said control signal begins at a substantial voltage polarity peak across said first capacitive element.

9. A power supply for energizing a load at a voltage magnitude less than the voltage magnitude provided by an A.C. source, comprising:
a first capacitive element in series connection with said load across said source, said first capacitive element having a reactance selected so as to cause a minimum desired current flow through said source;
a second capacitive element;
a single active switching device being a metal-oxide-semiconductor field-effect transistor (MOSFET) having a current-conductive path controlled by a control signal at a gate electrode, said switching device having a path controlled, responsive to a control circuit providing a control signal to cause said switching device to conduct current for a controlled time interval occuring once each source waveform cycle so as to connect said second capacitive element in parallel connection across said first capacitive element to allow current in a first of two directions with respect to said second capacitive element; and,
a unidirectionally-conducting element being a parasitic diode formed in parallel with the controlled current-conductive path of said MOSFET, said unidirectionally-conducting element being in parallel with the control path of said switching device and poled to conduct current in the remaining one of two directions with respect to said second capacitive element;
wherein conduction of said switching device and said unidirectionally-conducting element establishes a total load current by variations of a portion of the source waveform cycle during which an additional current flows through said second capacitive element and said load.

10. A power supply for energizing a load at a voltage magnitude less than a voltage magnitude provided by and A.C. source, comprising:
a first capacitive element in series connection with said load across said source, said first capacitor element having a reactance selected to cause a minimum desired current flow through said load;
a second capacitive element;
a single active switching device having a path controlled responsive to a control circuit providing a control signal to cause said switching device to conduct current for a control time interval occurring once each source waveform cycle so as to connect said second capacitive element in parallel connection across said first capacitive element to allow current flow in a first of two directions with respect to said second capacitive element; and,
a unidirectionally-conducting element being a parasitic diode formed in parallel with the controlled current-conductive path of said switching device, said unidirectionally-conducting element being in parallel with the control path of said switching device and poled to conduct current in the remaining one of two directions with respect to said second capacitive element;
wherein said switching device conducts for a first time interval during each source waveform, and wherein said unidirectional-conductive element conducts for a second time interval, different from the first time interval, during the same source wavefrom cycle, said switching device and said unidirectional-conductive element establishes a total load current by variations of a portion of the source waveform cycle during which an additional current flows through said second capacitive element and said load.

11. The power supply of claim 10, wherein said first and second time intervals are of substantially equal duration.

12. The power supply of claim 11, wherein said first means includes a monostable multivibrator having an output providing a variable duration control signal to cause said switching device to conduct, responsive to a trigger signal.

13. The power supply of claim 12, wherein a signal, responsive to the current flowing through said load, varies the output duration of said monostable multivibrator.

14. The power supply of claim 12, wherein said control circuit further includes means, monitoring at least one of the voltages across said load and the voltage across said first reactive element, for providing the trigger to said monostable multivibrator.

15. A power supply for energizing a load at a voltage magnitude less than the voltage magnitude provided by an A.C. source, comprising:
a first capacitive element in series connection with said load across said source, said first capacitive element having a reactance selected to cause a minimum desired current flow through said load;
a second capacitive element;
a single active switching device having a path controlled, responsive to a control circuit which includes first means for causing said switching device to conduct during a first time interval occurring substantially at a first positive-polarity voltage peak at the commencement of a source waveform cycle;
a unidirectionally-conducting element in parallel with the controlled path of said switching device and responsive to said first means of said control circuit to conduct during a second time interval occurring before the next positive-polarity voltage peak which occurs at the end of that same source waveform cycle;

wherein conduction of said switching device and said unidirectionally-conducting element establishes a total load current by variation of a portion of the source waveform cycle during which an additional current flows through said second capacitive element and said load.

16. The power supply of claim 15, wherein said first and second time intervals are of substantially equal duration.

17. The power supply of claim 16, wherein said first means includes a monostable multivibrator having an output providing a variable duration control signal to cause said switching device to conduct, responsive to a trigger signal.

18. The power supply of claim 17, wherein a signal, responsive to the current flowing through said load, varies the output duration of said monostable multivibrator.

19. The power supply of claim 17, wherein said control circuit further includes means, monitoring at least one of the voltages across said load and the voltage across said first reactive element, for providing the trigger to said monostable multivibrator.

20. The power supply of claim 15, wherein said load is an incandescent lamp.

21. The power supply of claim 2, wherein said control circuit provides said control signal to cause said switching device to conduct current for a controlled time interval occurring once each source waveform cycle.

22. The power supply of claim 21, wherein said control signal begins at a substantial voltage polarity peak across said first capacitive element.

23. The power supply of claim 21, wherein said switching device is a metal-oxide-semiconductor field-effect transistor (MOSFET) having a current-conductive path controlled by the control signal at a gate electrode; and said unidirectionally-conducting element is a parasitic diode formed in parallel with the controlled current-conductive path of said MOSFET.

24. The power supply of claim 21, whrein said switching device conducts for a first time interval during each source waveform cycle; and wherein said unidirectionally-conducting element conducts for a second time interval, different from the first time interval, during the same source waveform cycle.

25. The power supply of claim 24, wherein said first and second time intervals are of substantially equal duration.

26. The power supply of claim 25, wherein said first means includes a monostable multivibrator having an output providing a variable duration control signal to cause said switching device to conduct, responsive to a trigger signal.

27. The power supply of claim 26, wherein a signal, responsive to the current flowing through said load, varies the output duration of said monostable multivibrator.

28. The power supply of claim 26, wherein said control circuit further includes means, monitoring at least one of the voltages across said load and the voltage across said first reactive element, for providing the trigger to said monostable multivibrator.

29. The power supply of claim 21, wherein said control circuit includes first means for causing said switching device to conduct during a first time interval occurring substantially at a first positive-polarity voltage peak at the commencement of a source waveform cycle; and said unidirectionally-conducting element conducts during a second time interval occurring before the next positive-polarity voltage peak which occurs at the end of that same source waveform cycle.

30. The power supply of claim 29, wherein said first and second time intervals are of substantially equal duration.

31. The power supply of claim 30, wherein said first means includes a monostable multivibrator having an output providing a variable duration control signal to cause said switching device to conduct, responsive to a trigger signal.

32. The power supply of claim 31, wherein a signal, responsive to the current flowing through said load, varies the output duration of said monostable multivibrator.

33. The power supply of claim 31, wherein said control circuit further includes means, monitoring at least one of the voltages across said load and the voltage across said first reactive element, for providing the trigger to said monostable multivibrator.

34. The power supply of claim 1, wherein said load is an incandescent lamp.

* * * * *